United States Patent Office 3,133,046
Patented May 12, 1964

3,133,046
SELECTED TETRAHALO-1,2-CYCLOBUTANE-
DIONES AND DERIVATIVES THEREOF
David C. England, Wilmington, Del., assignor to E. I. du
Pont de Nemours and Company, Wilmington, Del., a
corporation of Delaware
No Drawing. Filed May 16, 1960, Ser. No. 29,188
17 Claims. (Cl. 260—63)

This invention relates to, and has as particular objects provision of, perhalocyclobutane-1,2-diones, the hydrates and hemiketals thereof, the polymers, including copolymers thereof, and methods for the preparation of the same.

This application is a continuation-in-part of my copending application Serial No. 731,606, filed April 29, 1958, and now abandoned.

Various 1,2-cycloalkanediones and the hydrocarbon-substituted derivatives thereof are known, including the four-membered ring diones, i.e., the 1,2-cyclobutanediones—see, for instance, Langenbeck et al., Ber. 61B, 938 (1928), Leonard, J. Am. Chem. Soc. 72, 5388 (1950) and 75, 3300 (1953). Some monohalogen-substituted 1,2-cyclobutenediones are also known—see, for instance, Roberts et al., J. Am. Chem. Soc. 77, 3420 (1955). Some polyhalogenated cyclobutanediones have been reported, more particularly, the 2,2-difluoro-1,3-cyclobutanediones carrying a quaternary ammonium substituent on the 4-carbon—see Pruett et al., J. Am. Chem. Soc. 74, 1633 (1952). Quite surprisingly, these polyhalogenated diones show no carbonyl reactions comparable to those of ordinary ketones.

A new class of stable, chemically versatile perhalocyclobutanediones, as well as the closely related hydrocarbon hemiketal and hydrate derivatives thereof, has now been discovered. These diones, in contrast to those of Pruett et al., exhibit normal ketone carbonyl behavior except as modified by the peculiar perhalo nature thereof.

These new products can be more fully characterized as the perhalo-1,2-cyclobutanediones, i.e., 3,3,4,4-tetrahalo-1,2-cyclobutanediones, wherein the various halogen substituents, which can be alike or different, are of atomic number from 9 to 35. These compounds and the related hydrates and hemiketals can be represented by the following structural formulas:

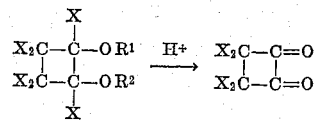

wherein the X's, which can be alike or different, are halogen of atomic number no greater than 35, i.e., from 9 to 35, and $R^1$ and $R^2$ are hydrogen or monovalent hydrocarbon or polyfluorohydrocarbon radicals, generally of no more than eight carbons each. Particularly outstanding among these new perhalo-1,2-cyclobutanediones because of more readily available intermediates are those wherein the halogens, which again can be alike or different, are of atomic number no greater than 17, i.e., from 9–17, and thus are fluorine or chlorine. Because of unusual chemical reactivity tetrafluoro-1,2-cyclobutanedione is especially outstanding.

These new perhalo-1,2-cyclobutanediones can be readily prepared by the strong acid hydrolysis of the corresponding perhalocyclobutane-1,2-diethers, e.g., the 1,2-bis-(hydrocarbonoxy)-1,2,3,3,4,4-hexahalocyclobutanes. This preparative route can be illustrated by the following equation wherein the X's and R's are as above:

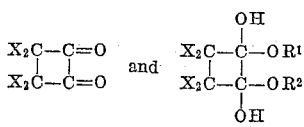

A convenient mode of preparation of these perhalocyclobutane-1,2-diethers is via the thermal dimerization, i.e., cycloaddition, of the corresponding perhalovinyl ethers. The 1,2-difluoro-2-halovinyl ethers can be prepared as in U.S. 2,737,530. Certain other perhalovinyl ethers are discussed in U.S. 2,784,175 and 2,799,712. The perfluorovinyl hydrocarbon and polyfluorohydrocarbon ethers can be readily prepared by reacting the appropriate sodium or other alkali metal alcoholate or phenolate with tetrafluoroethylene as illustrated below in Example I, Part A. These ethers are generally liquids with boiling points dependent upon their molecular weight and are soluble in the common organic solvents, such as ether, dioxane, and the like.

The perhalocyclobutane-1,2-diether intermediates can also be prepared by the direct halogenation of the requisite perhalocyclobutene-1,2-diethers. These latter compounds can be prepared from the necessary hydrocarbon and polyfluorohydrocarbon alcoholates or phenolates and the perhalocyclobutenes—see Park et al., J. Am. Chem. Soc. 71, 2337 (1949) and Barr et al., J. Am. Chem. Soc. 72, 4480 (1950).

The new perhalo-1,2-cyclobutanediones of this invention and the preparation thereof are illustrated in greater detail but are not to be limited by the following more specific example in which the parts given are by weight.

EXAMPLE I

Part A.—Preparation of Methyl Trifluorovinyl Ether

A pressure-resistant, steel reactor was charged with 32 parts of free flowing commercial sodium methoxide powder, about 100 parts of 1,4-dioxane freshly distilled from sodium, and 60 parts of tetrafluoroethylene containing 1% of a commercially-available terpene stabilizer (see U.S. Patent 2,407,405). The reactor was sealed and heated to 80° C. with shaking for one hour. The sealed reactor was then cooled and the reaction mixture discharged into a cooled receiver. The reaction mixture was purified by distillation through a precision fractionating column. There was thus obtained 44 parts (65% of theory) of methyl trifluorovinyl ether as a clear, colorless liquid boiling at 10.5–12.5° C. at atmospheric pressure. Similar results were obtained using larger charges of the sodium methoxide, e.g., 42 parts, and maintaining a constant tetrafluoroethylene pressure of 250 lbs./sq. in. gauge by repressuring as needed.

Part B.—Preparation of 1,2-Dimethoxyhexafluorocyclobutane

Each of four thick-walled cylindrical glass reactors, roughly 24 diameters long and of a total internal capacity corresponding to 150 parts of water, was cooled in a liquid nitrogen bath and charged with 50 parts of methyl trifluorovinyl ether, 0.5 part of phenothiazine inhibitor, and about 0.3 part of a commercially available terpene stabilizer (see U.S. Patent 2,407,405). The reactors were sealed and heated to 150° C. and held at this temperature for twelve hours. The reactors were then allowed to cool to room temperature, then cooled to liquid nitrogen temperatures, and finally opened to the atmosphere. The reactors were warmed carefully to vent any unreacted methyl trifluorovinyl ether. The remaining liquid reaction products were combined and fractionated by distillation. There was thus obtained 166 parts (83% of theory) of 1,2-dimethoxyhexafluorocyclobutane as a clear, colorless liquid boiling at 119–120° C. at atmospheric pressure. Similar preparations in which the reaction temperatures were raised to 175° C. and lowered to 125° C. afforded yields of 77% and 40% of theory, respectively, of the 1,2-dimethoxyhexafluorocyclobutane.

*Part C.—Preparation of Perfluorocyclobutane-1,2-Dione*

A mixture of 60 parts of the above 1,2-dimethoxyhexafluorocyclobutane and about 120 parts of concentrated sulfuric acid in a polyethylene reactor was heated at steam bath temperatures for four hours with stirring. The resulting fuming, brown, slushy reaction mixture was added with stirring to 200 parts of ice. The resulting tan reaction mixture containing some dark solid was extracted four times with a total of about 400 parts of diethyl ether. The ether extracts were combined and dried over anhydrous magnesium sulfate and finally filtered into a glass stillpot. The diethyl ether was removed by heating, maintaining the pot temperature below 80° C. There was thus obtained a nearly white, solid hydrate of perfluoro-1,2-cyclobutanedione.

The pot containing the solid hydrate was cooled in a solid carbon dioxide/acetone bath, charged with about 50 parts of phosphorus pentoxide, and fitted to a precision fractionation column, the receiving trap of which was likewise cooled in a solid carbon dioxide/acetone bath. The system was flushed well with nitrogen and then evacuated to a pressure corresponding to about 500 mm. of mercury. The pot was then heated, and blue vapors were soon evolved which collected in the cooled trap as a crystalline blue solid. The pot was heated slowly to about 200° C. and held there until blue vapors were no longer evolved. There was thus obtained about 20 parts (about 50% of theory) of perfluoro-1,2-cyclobutanedione as a crystalline blue solid. The product was melted to a blue liquid and poured into a glass stillpot containing about 10 parts of phosphorus pentoxide. Redistillation from this pot through a small precision fractionation column afforded about 15 parts of pure tetrafluorocyclobutane-1,2-dione as a blue liquid boiling at 34–35° C. at atmospheric pressure.

*Analysis.*—Calcd. for $C_4F_4O_2$: F, 48.7%; M.W., 156. Found: F, 48.7%; M.W., 154, 157.5.

These molecular weights were obtained by direct weighing of the vapors. The infrared and ultraviolet absorption spectra are fully consistent with the perfluoro-1,2-cyclobutanedione structure. The nuclear magnetic resonance spectrum is likewise consistent with this structure, exhibiting only a single fluorine peak and no hydrogen peaks.

The diketone was further characterized as tetrafluoro-1,2-cyclobutanedione by alkaline oxidation of the hydrate to 2,2,3,3-tetrafluoropropionic acid. This hydrate forms spontaneously with water or water vapor, even in air, and is a white crystalline solid from which, on treatment with phosphorus pentoxide, the blue diketone can be regenerated. The diketone should be handled in acid-washed glass receivers, preferably containing small amounts of phosphorus pentoxide.

The 2,2,3,3-tetrafluoropropionic acid, obtained as described above by oxidation of the diketone hydrate, was a clear, colorless liquid boiling at 132–136° C. at atmospheric pressure. Authentic 2,2,3,3-tetrafluoropropionic acid, as obtained from oxidation of the 1:1 tetrafluoroethylene:methanol adduct (i.e., 2,2,3,3-tetrafluoropropanol), boils at 133° C. at atmospheric pressure. A p-chloroaniline salt of the 2,2,3,3-tetrafluoropropionic acid obtained by hydrolysis of the diketone hydrate melted at 116–117° C. versus a melting point of 117–118° C. for the p-chloroanilinium salt of authentic 2,2,3,3-tetrafluoropropionic acid. Furthermore, the mixed melting point was not lowered. The neutral equivalent of the p-chloroanilinium salt of the 2,2,3,3-tetrafluoropropionic acid obtained by hydrolysis of the diketone hydrate was 272 versus the calculated value of 273.6.

The present invention is generic to the perhalo-1,2-cyclobutanediones and the hydrates and hydrocarbon hemiketals thereof wherein the halogens are of atomic number from 9 to 35 and preferably from 9 to 17. Thus, the present invention is generic to the 3,3,4,4-tetrahalo-1,2-cyclobutanediones and the hydrates and hemiketals thereof wherein the four halogens, which can be alike or different, on the 3- and 4-carbons can be fluorine, chlorine, or bromine. Because of readier availability of the necessary intermediates, the halogens are preferably chlorine or fluorine. Because of unusual chemical reactivity of the product, the halogens are preferably all fluorines.

These new perhalo-1,2-cyclobutanediones can be readily obtained by the strong acid hydrolysis of the corresponding hexahalo-1,2-cyclobutane diethers. These in turn can be readily obtained by the cycloaddition reaction between two molecules of the requisite perhalovinyl ethers. The overall synthesis can be represented by the following equation:

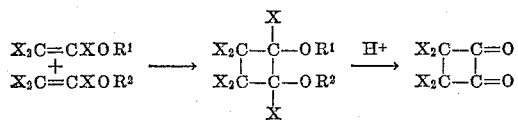

wherein the X's, which can be alike or different, are used to represent halogen of atomic number from 9 to 35, and preferably from 9 to 17, and especially fluorine, and $R^1$ and $R^2$, which also can be alike or different, are used to represent monovalent hydrocarbon and polyfluorohydrocarbon radicals, i.e., alkyl, alkenyl, aryl, alkaryl, aralkyl, and cycloalkyl radicals and the corresponding polyfluorocarbon radicals, usually of no more than eight carbons each.

The hydrolysis of the hexahalo-1,2-cyclobutane diethers to the diketones will be effected by the following process steps:

(1) The 1,2-diether intermediate is reacted with 90–110% sulfuric acid at temperatures in the range 50–150° C. for periods of time ranging from two to eight hours, said periods varying inversely as is usual with the temperature, i.e., as the temperature decreases, longer times are required;

(2) The resultant material from the sulfuric acid reaction is hydrolyzed with at least four moles of water per mole of 1,2-diether charged. This necessary hydrolysis step optionally can be carried out separately or can be carried out concurrently with step 1 when less than 100% pure sulfuric acid is used, provided sufficient quantities of the latter are present to supply the necessary at least four moles of water;

(3) The reaction mixture from step 1 and/or steps 1 and 2 is further diluted with water and the organic portion thereof separated from the aqueous sulfuric acid by extraction with a water-immiscible organic solvent therefor;

(4) The organic portion is isolated from the said organic solvent extract; and (5) The isolated said organic portion is dehydrated by reaction with $P_2O_5$ at an elevated temperature.

These reactions can be effected properly in the presence or absence of insert liquid organic reaction media. For the lower boiling diketones, e.g., the tetrafluoro compound, all reactions will be carried out in closed systems. Any such diluent can be used. Generally speaking, the most common are the normally liquid hydrocarbons and polyfluoro hydrocarbons, including aliphatic and aromatic compounds such as the hexanes, heptanes, octanes, and the like; benzene, toluene, the xylenes, and the like; cycloaliphatic hydrocarbon solvents such as cyclohexane and the like; polyfluoroaliphatic hydrocarbons, e.g., 1,1,2,2-tetrafluoro-3,3-dimethylbutane and the like; polyfluoroaliphatic/cycloaliphatic hydrocarbons, e.g., perfluoromethylcyclohexane and the like.

It is usually most convenient to operate without a solvent.

As stated in the foregoing, this invention is generic to the perhalo-1,2-cyclobutanediones and the preparation thereof from the corresponding perhalo-1,2-cyclobutane diethers, which can be most conveniently prepared by the cycloaddition of the requisite perhalovinyl ethers. Thus, in addition to the foregoing fully detailed disclosure, the following perhalo-1,2-cyclobutane diethers and the perhalo-1,2-cyclobutanediones obtained therefrom are likewise illustrative of the scope of the present invention. Cyclodimerization of n-octyl 2-chloro-1,2,-difluorovinyl ether affords 3,4-dichloro-1,2,3,4-tetrafluoro-1,2-bis(n-octyloxy) cyclobutane, from which upon strong acid hydrolysis there is obtained 3,4-dichloro-3,4 - difluoro - 1,2 - cyclobutanedione. Cyclodimerization of ethyl 2,2-dichloro-1-fluorovinyl ether affords 3,3,4,4 - tetrachloro-1,2-diethoxy-1,2-difluorocyclobutane, from which upon strong acid hydrolysis there is obtained 3,3,4,4-tetrachloro-1,2-cyclobutanedione.

The cycloaddition reaction does not have to be a homocycloaddition, but it is also inclusive of the cycloaddition of two different perhalovinyl ethers. Thus, cycloaddition of tertiary butyl 1,2-dichloro-2-fluorovinyl ether with methyl 2,2-dichloro-1-fluorovinyl ether affords 1-methoxy - 2 - tert. - butoxy - 1,3 - difluoro - 2,3,4, - tetrachlorocyclobutane, from which upon strong acid hydrolysis there is obtained 3,4,4-trichloro-3-fluoro-1,2-cyclobutanedione. Cyclodimerization of phenyl trichlorovinyl ether results in the formation of 1,2-diphenoxyperchlorocyclobutane, from which by strong acid hydrolysis, e.g., concentrated sulfuric acid, there is obtained perchlorocyclobutane-1,2-dione. Cycloaddition of n-butyl 2-bromo-1,2-difluorovinyl ether to cyclohexyl 1,2-dichloro-2-fluorovinyl ether results in the formation of 1-n-butoxy-2-cyclohexyloxy-4-bromo-2,3-dichloro - 1,3,4 - trifluorocyclobutane, from which upon strong acid hydrolysis there is obtained 4 - bromo - 3 - chloro-3,4-difluoro-1,2-cyclobutanedione. Cyclodimerization of benzyl 2,2-dibromo-1-fluorovinyl ether results in the formation of 1,2-dibenzyloxy-3,3,4,4-tetrabromo-1,2 - difluorocyclobutane, from which upon strong acid hydrolysis there is obtained perbromo-1,2-cyclobutanedione.

Further, cyclodimerization of 2,2,2-trifluoroethyl trifluorovinyl ether results in the formation of 1,2-bis(2,2,2-trifluoroethoxy)hexafluorocyclobutane, from which upon strong acid hydrolysis there is obtained 3,3,4,4-tetrafluoro-1,2-cyclobutanedione. Cyclodimerization of 2,2,3,3-tetrafluoro-n-propyl trifluorovinyl ether results in the formation of 1,2-bis(2,2,3,3-tetrafluoro-n-propoxy)hexafluorocyclobutane, from which upon strong acid hydrolysis there is obtained 3,3,4,4 - tetrafluoro - 1,2,-cyclobutanedione. Cyclodimerization of 2,2,3,3,4,4,5,5-octafluoro-n-pentyl trifluorovinyl ether results in the formation of 1,2-bis(2,2,3,3,4,4,5,5-octafluoro - n-pentoxy)hexafluorocyclobutane, from which upon strong acid hydrolysis there is obtained 3,3,4,4-tetrafluoro-1,2-cyclobutanedione. Cyclodimerization of 4-pentenyl trifluorovinyl ether results in in the formation of 1,2-bis(4-pentenyloxy)hexafluorocyclobutane, from which upon strong acid hydrolysis there is obtained 3,3,4,4-tetrafluoro-1,2,-cyclobutanedione.

These new perhalo-1,2-cyclobutanediones are versatile chemical intermediates. As cyclic ketones, they readily form hydrates and hemiketals through one or both ketone carbonyl groups. The present invention is likewise generic to these derivatives. The dihydrate is characterized as white, slender plates, melting at 108–111° C. The diketones themselves are extremely reactive materials; whereas, the hydrates and hemiketals are much more stable and can more readily be handled. Accordingly, in most systems it will be simpler to handle the diketone as the hydrate or hemiketal regenerating the free diketone as required. Depending on the nature of the four halogen substituents on the 3- and 4-carbons, the reactivity and physical properties of the diketones will vary widely. Thus, in the case of the lowest molecular weight compound, i.e., tetrafluoro-1,2-cyclobutanedione, the compounds is a liquid boiling at 34–35° C. and exhibiting an intense and deep blue coloration.

As the atomic weight of the halogens in the perhalodiketone increases, so too does the molecular weight of the diketone, and along with this increase there are found corresponding increases in the boiling point and changes in the physical properties as well as chemical properties. Thus, in the case of the highest molecular weight products, i.e., the perbromo-1,2-cyclobutanedione, the product is a solid. The intermediate and mixed various halogenated diketones exhibit intermediate physical and chemical properties between the extremes of the perfluoro- and perbromodiketones. As the degree of fluorine substitution increases so does the chemical reactivity of the diones.

As noted above, bishemiketals of the tetrahalo-1,2-cyclobutanediones likewise form part of the present invention. These bishemiketals represent a form of the highly reactive dione potentially very convenient for handling the same. The bishemiketals, particularly those with hydrocarbyl alcohols and phenols, are relatively high boiling liquids with boiling points increasing both with the atomic weight of the halogen substituents and with the chain length of the alcohol and phenol moieties employed.

The hemiketals of the highest molecular weight tetrahalo-, i.e., tetrabromo-, 1,2-cyclobutanediones are normally solids at room temperature. The dimethyl hemiketal of tetrafluoro-1,2-cyclobutanedione, more properly named as 3,3,4,4-tetrafluoro-1,2-dihydroxy-1,2-dimethoxycyclobutane, is a colorless solid soluble in water, melting at 39–42° and boiling at 59° C. under a pressure corresponding to 3 mm. of mercury. The bisethyl hemiketal of tetrafluoro-1,2-cyclobutanedione is a clear, colorless liquid boiling at 54° C. under a pressure corresponding to 0.3 mm. of mercury. The half-methyl hemiketal of tetrafluoro-1,2-cyclobutanedione is a white solid, melting at 100–101° C. This compound can also be named as 3,3,4,4 - tetrafluoro - 1,2,2 - trihydroxy - 1 - methoxycyclobutane. The half-ethyl hemiketal, more properly called 1-ethoxy-3,3,4,4-tetrafluoro-1,2,2-trihydroxycyclobutane, is a white crystalline solid melting at 101–104° C. Both the bis- and half-hemiketals are readily formed by direct addition of the tetrahalo-1,2-cyclobutanedione and stoichiometric quantities of the corresponding alcohol under a wide variety of noncritical conditions.

EXAMPLE II

In addition to their utility as versatile chemical intermediates, the perhalo-1,2-cyclobutanediones have other uses based on a combination of their chemical reactivity and their peculiar physical properties.

The compound 3,3,4,4-tetrafluoro-1,2-cyclobutanedione is of use as a reagent chemical or indicator for determining the quantity of active protonic substances present in inactive nonprotonic substances. Specifically, the tetrafluoro-1,2-cyclobutanedione can be used as a reagent indicator for determining the quantities of such active protonic substances as water and alcohols present in organic media free of protonic hydrogen.

To serve as a basis for a series of tests, five grams of tetrafluorocyclobutanedione was dissolved in 40 ml. of anhydrous tetrahydrofuran. About two grams of solid precipitated out and was removed by filtration, leaving a clear, red solution containing three grams of dissolved tetrafluoro-1,2-cyclobutanedione. This clear solution, 0.48 molar in dione, was stored under nitrogen in a bottle sealed with a rubber serum cap. Dione solution was then drawn from the bottle by means of a calibrated hypodermic syringe and injected dropwise into solutions containing known amounts of water, methanol, or ethanol in tetrahydrofuran (THF), until a slight pink coloration persisted in the solutions for about one minute. The data of the following table show that consumption of dione is proportional to the amount of water or alcohol present:

TABLE

| | Ml. of dione soln. required | Apparent normality of the dione soln. (theory=0.96) |
|---|---|---|
| (a) Ml. of THF soln. 0.278 molar in H₂O: | | |
| 1.0 | 0.3 | 0.93 |
| 2.0 | 0.6 | 0.93 |
| 2.0 | 0.7 | 0.79 |
| 3.0 | 0.9 | 0.93 |
| 3.0 | 0.9 | 0.93 |
| 4.0 | 1.3 | 0.86 |
| 4.0 | 1.3 | 0.86 |
| 5.0 | 1.6 | 0.87 |
| 5.0 | 1.4 | 0.99 |
| 8.0 | 2.3 | 0.96 |
| 10.0 | 3.1 | 0.90 |
| 20.0 | 5.7 | 0.97 |
| (b) Ml. of 0.248 molar Methanol: | | |
| 1.0 | 0.25 | 0.99 |
| 3.0 | 0.80 | 0.92 |
| (c) Ml. of 0.174 molar Ethanol: | | |
| 1.0 | 0.20 | 0.87 |
| 2.0 | 0.40 | 0.87 |
| 4.0 | 0.80 | 0.87 |

The new tetrahalo-1,2-cyclobutanediones are also useful in the preparation of new types of polymers and copolymers. The tetrahalo - 1,2 - cyclobutanediones can homopolymerize and copolymerize with other species within the genus without the presence of any added initiator. Likewise, they form copolymers with those monomers capable of polymerization by anionic mechanisms wherein the monomer molecules contain at least one oxygen or sulfur atom involved in a multiple bond linkage, and especially the carbonyl and thiocarbonyl monomers, e.g., the aldehyde and ketone types. The instant invention is, of course, generic to all these polymers, i.e., homopolymers and copolymers with one or more other monomers.

The polymers and copolymers of this new class of tetrahalo-1,2-cyclobutanediones are characterized by a plurality of recurring cyclic structures:

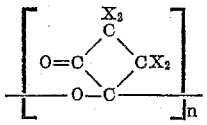

Thus, the combined units of the tetrahalo-1,2-cyclobutanediones will be poly[oxy(3,3,4,4-tetrahalo-2-oxocyclobutylidene)] units. Consequently, the structure of these polymers can be regarded in one sense as a recurring spiro structure. The main chain of the polymer will contain recurring oxygen and carbon atoms, along with, of course, the combined units of any comonomers being used, and the chain carbons adjacent the chain oxygen will have both remaining valences satisfied by linkage to the α- and γ-carbons of a β,β,γ,γ-tetrahalo-α-oxotrimethylene diradical. This peculiar structure is unique and believed responsible for, at least in part, the peculiar properties of these polymers.

The new polymers from these diketones are useful in powder and/or shaped form, e.g., blocks, films, and fibers, as adsorbents for protonic substances generically, e.g., water, alcohols, amines, and the like. It is believed the adsorbency of the polymers for these protonic substances functions through the 2-oxo substituent in the 3,3,4,4-tetrahalo-2-oxocyclobutylidene rings, i.e., to form derivatives of the type illustrated by the following equation:

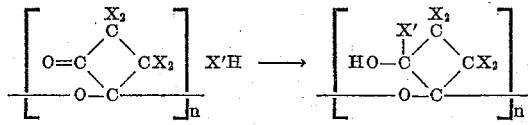

wherein X'— is used to indicate the residue of the protonic substance X'H and X'— itself is used to indicate such residues as HO—, RO—, RNH—, wherein R is used to indicate such groups as alkyl, aryl, alkaryl, aralkyl, and cycloalkyl as well as the various halosubstituted, particularly fluoro-substituted, analogs. In some instances this adsorption reaction of the protonic agent is reversible and the polyoxy-(3,3,4,4-tetrahalo-2-oxocyclobutylidene) polymers can be regenerated. For instance, in the case of the hydrate and hemiketal derivatives, i.e., where X'— in the above equation equals HO— and RO—, the reaction can be reversed by treatment with strong dehydrating agents, such as phosphorus pentoxide, sometimes at elevated temperatures. In some instances quite akin to the use of the monomers themselves as reagent chemicals based on the color change reaction effected when the monomer is converted to an adduct with an active protonic agent, the polymers wherein the 3,3,4,4-tetrahalo-2-oxocyclobutylidene ring still exists can serve as indicator agents for the presence of even trace quantities of active protonic substances. This is based on the fact that the polymers themselves are white solids; whereas, some of the polymeric adducts with active protonic agents are colored, e.g., in the case of the alcohol adducts which are presumably the polycyclic hemiketals.

The following details are submitted to illustrate the above-discussed polymers and copolymers and means for preparation thereof.

EXAMPLE III

*Preparation of Poly[Oxy(3,3,4,4-Tetrafluoro-2-Oxocyclobutylidene)]*

About 3 g. of 3,3,4,4-tetrafluoro-1,2-cyclobutanedione was distilled from a calibrated cold trap through a vacuum manifold system into a glass reactor fitted with magnetic stirring means and containing about 15 parts of anhydrous diethyl ether cooled to —78° C. The evacuated system was brought to atmospheric pressure slowly by input of anhydrous nitrogen. Then about 0.1 part of a 20% solution of dimethylformamide in anhydrous diethyl ether was added with stirring, the cooling bath was removed, and the solution allowed to warm slowly to 0° C. with stirring and held at that temperature for one hour. During this period solid white polymer precipitated from the ether solution. An additional 0.05 part of dimethylformamide was added to remove further any unreacted dione and the solution allowed to stand with stirring for an additional 1½ hours at 0° C. The diethyl ether was removed from the reactor by continuous pumping at reduced pressure, leaving only solid white polymer. The solid residue of poly[oxy(3,3,4,4-tetrafluoro-2-oxocyclobutylidene)] was broken up and dried under high vacuum for 2½ hours at room temperature.

*Analysis.*—Calcd. for C₄F₄O₂: C, 30.8%; H, 0.0%; F, 48.8%; N, 0.0%. Found: C, 31.6%; H, 0.5%; F, 47.5%; N, 0.1%.

EXAMPLE IV

*Use of Poly[Oxy(3,3,4,4-Tetrafluoro-2-Oxocyclobutylidene)]*

A sample of the above white poly[oxy(3,3,4,4-tetrafluoro-2-oxocyclobutylidene)] was treated with ethyl alcohol. An exothermic reaction resulted immediately. After the exothermic reaction had subsided, the solution was heated at about 65–75° C. for ½ hour and then filtered. The light yellow filtrate was divided into two portions, one of which was dried at 100° C. under high vacuum. There was thus obtained the ethanol adduct of poly[oxy(3,3,4,4-tetrafluoro-2-oxocyclobutylidene)] as a light yellow powder. The formation of the yellow color indicates the presence of the protonic reactant, i.e., ethyl alcohol. The diketone polymer is thus an indicator for the hydrogen ion.

*Analysis.* — Calcd. for (C₄F₄O₂)₁.₈·(C₂H₅OH): C, 33.8%; H, 1.8%; F, 41.7%. Found: C, 33.6%; H, 1.9%; F, 41.5%.

EXAMPLE V

*Prepration of a Copolymer of Thiocarbonyl Difluoride and 3,3,4,4-Tetrafluoro-1,2-Cyclobutanedione*

In a glass reactor equipped with magnetic stirring means, well swept with a stream of gaseous helium, and cooled to −78° C. by an external solid carbon dioxide/acetone bath were placed under anhydrous conditions in order about 15 parts of anhydrous (dried over sodium) diethyl ether, about 1.5 parts of liquid 3,3,4,4-tetrafluoro-1,2-cyclobutanedione (measured at −80° C.), about 4.5 parts of liquid thiocarbonyl difluoride (measured at −80° C.), and about 3.5 parts of anhydrous diethyl ether containing about 0.05 part of dimethylformamide freshly distilled from phosphorus pentoxide. Solid white copolymer formed immediately, and the characteristic deep blue color of the dione gradually disappeared. After 4 hours at −78° C., the reaction mixture was poured into hot water and then heated to drive off all diethyl ether. During this process the copolymer turned yellow in color. The copolymer was then washed with acetone until white and dried in a vacuum oven at 60° C. There was thus obtained 3.5 parts of a (thiodifluoromethylene)-[oxy-(3,3,4,4-tetrafluoro-2-oxocyclobutylidene)] copolymer as a white solid exhibiting an inherent viscosity of 3.29 as measured in chloroform at 25° C. at a concentration of 0.1%. Carbon analysis (16.4%) indicated the copolymer to be a 94/6 (thiodifluoromethylene)[oxy(3,3,4,4-tetrafluoro-2-oxocyclobutylidene)] copolymer. A soft, self-supporting, semielastomeric film was obtained from the copolymer by pressing at 150° C. at 15,000 lbs./sq. in. for two minutes.

Since obvious modifications in the invention will be evident to those skilled in the chemical art, I propose to be bound solely by the appended claims.

The embodiments of the invention in which an exclusive property or privilege is claimed are defined as follows:

1. The process which comprises the steps of (1) reacting, with sulfuric acid of about 90–110% concentration and at a temperature of about 50–150° C., a hexahalo-1,2-cyclobutane diether wherein the halogen is of atomic number no greater than 35 and the oxygens of the ether linkages are joined to a member of the group consisting of monovalent hydrocarbon and polyfluorohydrocarbon radicals of up to 8 carbons, (2) hydrolyzing the reaction mixture from step (1) with at least four moles of water per mole of 1,2-diether employed, (3) diluting the reaction mixture from step (2) further with water and extracting the organic portion therefrom with a water-immiscible organic solvent, (4) isolating the dissolved organic material from the solvent, and (5) dehydrating the organic material with phosphorus pentoxide at an elevated temperature.

2. The process of claim 1 wherein steps (1) and (2) are accomplished simultaneously.

3. The process of claim 1 wherein all halogen is fluorine.

4. The process which comprises maintaining 3,3,4,4-tetrafluoro-1,2-cyclobutanedione in contact with an anionic polymerization initiator at a temperature in the range from about −80° C. to 0° C. and thereby polymerizing the same.

5. The process which comprises contacting 3,3,4,4-tetrafluoro-1,2-cyclobutanedione with thiocarbonyl difluoride and an anionic polymerization initiator at a temperature in the range from about −80° C. to 0° C., thereby forming a copolymer.

6. 3,3,4,4-tetrahalo-1,2-cyclobutanediones wherein all halogen is of atomic number no greater than 35.

7. 3,3,4,4-tetrafluoro-1,2-cyclobutanedione.

8. Compounds of the formula

wherein $R^1$ and $R^2$ are selected from the group consisting of hydrogen and monovalent hydrocarbon and polyfluorohydrocarbon of up to 8 carbons.

9. Perfluoro-1,2-cyclobutanedione hydrate.

10. The dimethyl hemiketal of tetrafluoro-1,2-cyclobutanedione.

11. The diethyl hemiketal of tetrafluoro-1,2-cyclobutanedione.

12. The half-methyl hemiketal of tetrafluoro-1,2-cyclobutanedione.

13. The half-ethyl hemiketal of tetrafluoro-1,2-cyclobutanedione.

14. A copolymer of a 3,3,4,4-tetrahalo-1,2-cyclobutanedione of claim 6 and another polymerizable monomer containing a member of the group consisting of doubly bonded oxygen and sulfur, said copolymer containing at least about 6% by weight based on the weight of the polymer of oxy(3,3,4,4-tetrahalo-2-oxocyclobutylidene) units.

15. A copolymer of 3,3,4,4-tetrafluoro-1,2-cyclobutanedione and thiocarbonyl fluoride containing at least about 6% by weight based on the weight of the copolymer of oxy(3,3,4,4-tetrahalo-2-oxocyclobutylidene) units.

16. A homopolymer of a 3,3,4,4-tetrahalo-1,2-cyclobutanedione of claim 6 consisting essentially of oxy(3,3,4,4-tetrahalo-2-oxocyclobutylidene) units.

17. A homopolymer of 3,3,4,4-tetrafluoro-1,2-cyclobutanedione consisting essentially of oxy(3,3,4,4-tetrahalo-2-oxocyclobutylidene) units.

References Cited in the file of this patent

Ramirez et al.: J. Am. Chem. Soc., volume 26, pages 491–3 (1954).

Chemical Abstracts, volume 46, 1952, page 5693.